No. 772,228. PATENTED OCT. 11, 1904.
F. M. EWELL.
VINE CUTTER.
APPLICATION FILED MAY 9, 1904.
NO MODEL.
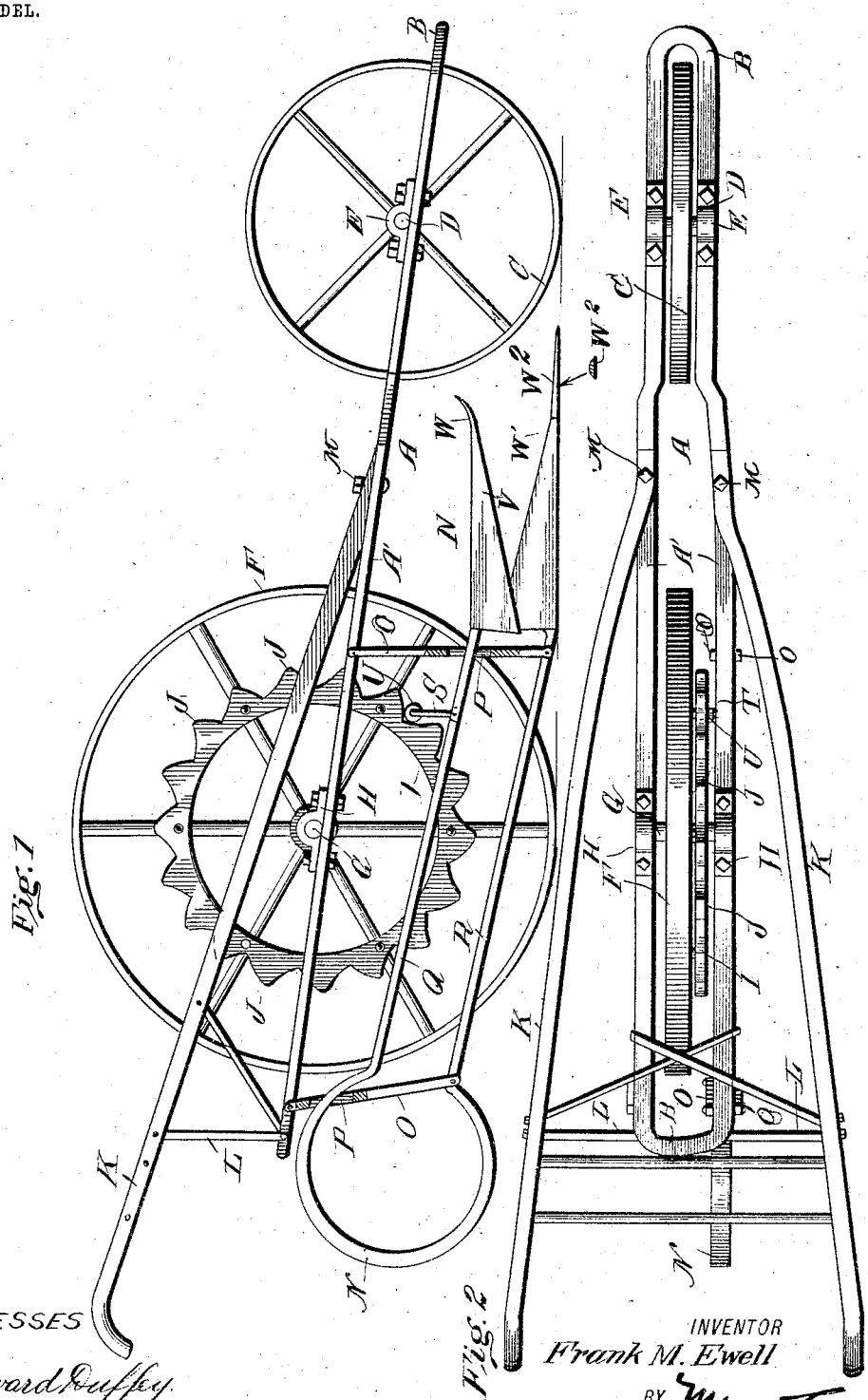
WITNESSES
C. Edward Duffy.
Harrison B Brown
INVENTOR
Frank M. Ewell
BY Munn & Co.
ATTORNEYS No. 772,228.

Patented October 11, 1904.

UNITED STATES PATENT OFFICE.

FRANK MARION EWELL, OF EGYPT, WASHINGTON.

VINE-CUTTER.

SPECIFICATION forming part of Letters Patent No. 772,228, dated October 11, 1904.

Application filed May 9, 1904. Serial No. 206,979. (No model.)

*To all whom it may concern:*

Be it known that I, FRANK MARION EWELL, a citizen of the United States, and a resident of Egypt, in the county of Lincoln and State of Washington, have invented certain new and useful Improvements in Vine-Cutters, of which the following is a specification.

My invention relates to devices of the above-stated character adapted for cutting running vines, grass, and other similar uses.

The object had in view is to simplify and improve cutters of this character as they have heretofore been constructed; and to such end I have invented the vine-cutter shown in the accompanying drawings and hereinafter fully described.

The invention resides in the special construction and arrangement of parts pointed out in the subjoined claims.

In the drawings, Figure 1 is a view showing my invention in side elevation, and Fig. 2 is a top plan view thereof.

In carrying out my invention I employ an elongated beam A, formed of side members A', held suitably spaced by end connections B, as shown in Fig. 2. The space between the members A' of the beam at its forward end is made suitably contracted and a wheel C arranged therein on an axle D, supported in bearings E. In the enlarged space between the side members of the beam and near its rear end I arrange a wheel F on an axle G, having support in bearings H on the side members of the beam.

I denotes a substantially annular rim fixedly secured to the spokes of the wheel F and slightly offset therefrom, as indicated in Fig. 2. The outer periphery of the rim I is provided with a series of cam-acting teeth J for the purpose described farther on.

The beam A above described is provided with handles K, suitably braced and supported at their rear ends, as indicated at L, and with their forward ends secured to the beam by bolts M or other suitable means.

In the make-up of my invention I employ a pair of spring-bow shears N, similar to the well-known yielding sheep-shears, and support the same by hangers O, depending from the beam A. In Fig. 1 the hangers are broken away, showing slots P, wherein the upper arm Q of the shears is arranged for support and guided operation. The lower ends of the hangers O are secured to the lower arm R of the shears by bolts or other approved means. It will be noticed that the shears are supported and arranegd for operation through means of a standard S on the upper arm Q of the shears, having an inturned end T with a roller U therewith, the latter being located adapted for engaging the cam-teeth J, whereby the upper blade V of the shears is worked upon rolling action of the wheel F as the device is shoved along. The forward end W of the blade V is turned upwardly the better to engage and guide vines into cutting position between it and the lower blade W'. The latter's point $W^2$ is extended and pointed the better for picking up vine-runners laying close to the ground. The under side of the point $W^2$ is made flat and its upper side slightly oval.

The invention will be understood from the above description and its use apparent in cutting strawberry and other vine runners, as also for cutting lawn edges.

Having thus described my invention, what I claim as new, and desire to secure by Letters Patent, is—

1. In combination with a beam and supporting-wheels therefor, yielding shears employing a fixedly-held blade and a similar blade adapted to be worked, supporting-hangers for the shears adapted to guide the working blade, a series of cams on one side of the supporting-wheel, and means on the working blade of the shears wherewith the cams are adapted to engage, substantially as described.

2. In combination, the beam and its supporting-wheels, a series of cams in circular arrangement on one side of the supporting-wheel, spring-bow shears, hangers depending from said beam and having their lower ends secured to the lower shear-blade, the hangers being provided with slots wherein the upper shear-blade may vibrate and be guided, and a projection on the upper shear-blade wherewith in use, said cams are adapted to engage, substantially as described.

3. In a vine-cutter, the combination with suitable supporting and working means, a pair of shears with one blade thereof held fixed and the other adapted to be worked, the upper blade being provided with an upturned point, and the fixed blade having an extended point, substantially as described.

4. The combination with a vine-cutter, employing yielding shears and suitable supporting and carrying means, of an upturned point on the upper blade of the shears, and an extended point on the lower blade, said extended point being made flat on its under side and oval on its upper side, substantially as described.

FRANK MARION EWELL.

Witnesses:
H. H. McMILLAN,
E. R. STEELE.